June 7, 1960 G. H. DOERRIES 2,939,329
POWER TRANSMITTING DEVICE WITH SPRING CLUTCH ACTUATION
Filed Sept. 24, 1959
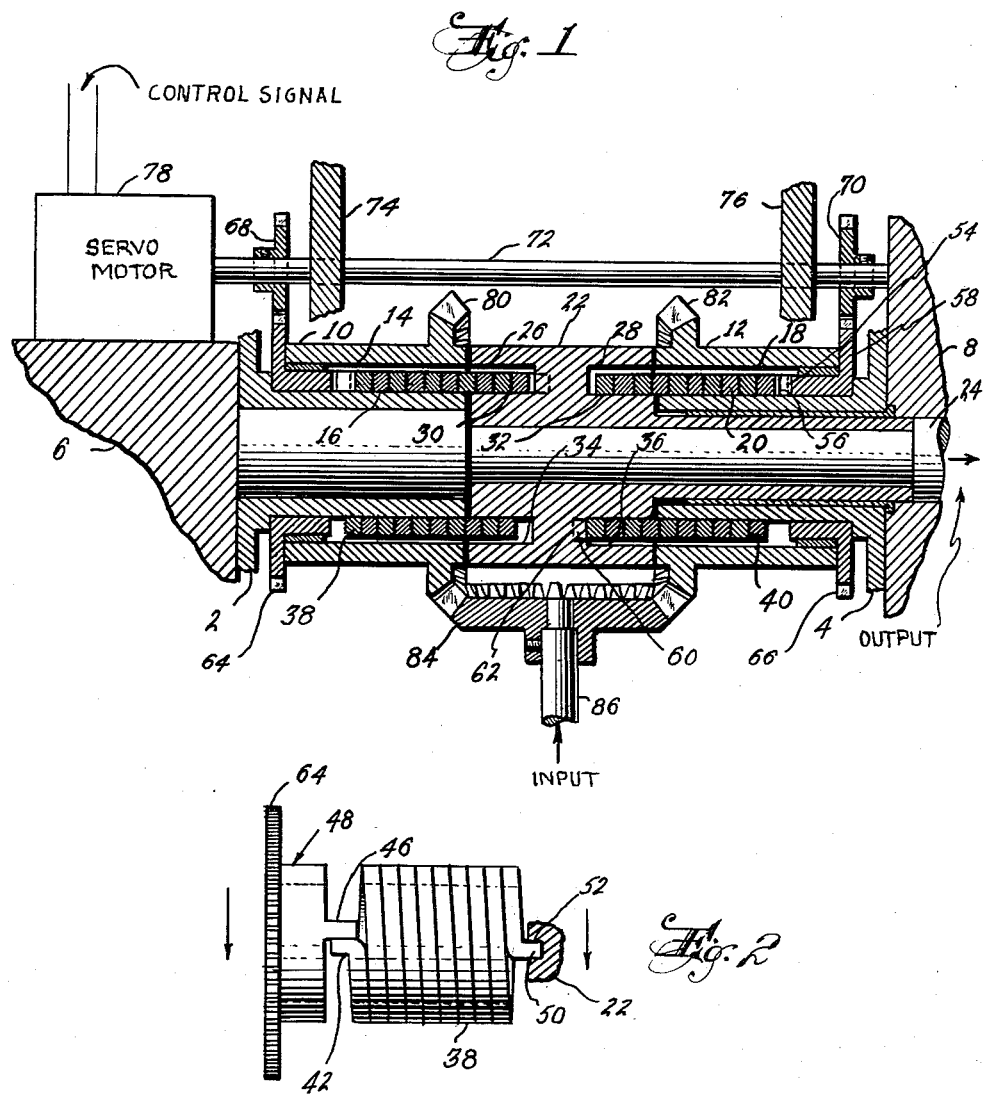
Inventor:
George H Doerries
By William F. Eby
his Attorney United States Patent Office 2,939,329
Patented June 7, 1960

2,939,329

POWER TRANSMITTING DEVICE WITH SPRING CLUTCH ACTUATION

George H. Doerries, West Caldwell, N.J., assignor to Curtiss-Wright Corporation, a corporation of Delaware Filed Sept. 24, 1959, Ser. No. 842,065

9 Claims. (Cl. 74—388)

My invention relates to a power transmitting device having an output controlled according to the operation of spring clutch actuating means.

Power transmitting devices may incorporate spring clutches of the type comprising precision wound and ground helical springs, which tighten or loosen their grip on cylindrical surfaces in response to forces which tend to wind or unwind them. Inasmuch as spring clutches are fast acting they are particularly suitable for use in devices where an almost immediate response to a control signal is required. If such a clutch is constructed with the spring between inside and outside walls of concentric cylindrical members, the spring will engage the outer diameter of the inside member in response to a force tending to wind the spring and will engage the inside diameter of the outer cylindrical member in response to a force tending to unwind the spring. An arrangement of this sort is used in the device of the invention.

A prime object of the invention is to provide a novel and improved power transmitting device wherein control means regulate the operation of spring clutches to provide for the rotation of an output member in either of two opposite directions at a desired speed.

Other objects and advantages of the invention will become apparent during a reading of the specification taken in connection with the accompanying drawing.

In the device of the invention a helical spring of rather precise dimension is biased to engage surfaces of fixed structure and a rotatably mounted output member to thereby hold the output member against rotation in a particular direction. Rotatable mechanism is however provided for actuating the spring into contact with another surface of the output member and a surface of a rotatable input member. The actuating mechanism is driven by a motor operable at a speed less than the speed of the input members such that the spring may be caused to periodically contact the input member and a surface of the output member thereby drivably connecting input and output members, and may periodically be permitted to grip the output member and fixed structure. Controlling spring action in this manner causes the output member to be rotated intermittently at an average speed determined according to the input signal to the motor. By utilizing two input members and two springs in combination with the output member and fixed structure, the output member may be held against rotation in either of two opposite directions or be advanced in steps by one or the other of the input members in either of the opposite directions.

Referring to the drawings,

Fig. 1 is a vertical sectional view taken through the device of the invention,

Fig. 2 is a plan view of one of the helical springs used in the device and actuating mechanism therefor.

In the drawings reference characters 2 and 4 designate a pair of fixed cylindrical members secured in a suitable manner to stationary structures such as 6 and 8 respectively. Mounted for rotation about fixed members 2 and 4 are a pair of cylindrical input members 10 and 12 respectively. The inner cylindrical surface 14 of input member 10 is concentric with and spaced from the outer cylindrical surface 16 of fixed member 2. Similarly the inner cylindrical surface 18 of input member 12 is concentric with and spaced from outer cylindrical surface 20 of the fixed member 4. A cylindrical output member 22 is disposed between the fixed members 2 and 4, and the input members 10 and 12. Such output member 22 is rotatably mounted and has an axis of rotation in common with the axes of the fixed and input members. As shown, output member 22 is integral with an output shaft 24. Output member 22 includes a pair of annular slots 26 and 28 which define inner cylindrical surfaces 30 and 32, and outer cylindrical surfaces 34 and 36. The surfaces 16, 30, 32 and 20 are all at the same radius from the common axis of the fixed and output members. Cylindrical surfaces 14, 34, 36 and 18 are also at equal radii from the common axis of the cylindrical members.

A precision wound and ground helical spring 38 is disposed between surfaces 16, 30; and surfaces 14, 34. Another such spring 40 is disposed between the surfaces 20, 32; and 18, 36. The normal inside diameter of the spring 38 and 40, that is before the springs are assembled in the device, is less than the diameter of cylindrical surfaces 16, 30, 20 and 32. These springs, therefore, grip these surfaces of the fixed and input members in the device. As shown, opposite ends of the springs are provided with tangs. One end of the spring 38 includes the tang 42 which is engageable by a projection 46 on an actuating member 48. The other end of the spring 38 includes the tang 50 which is confined in a slot 52 in output member 22. One end of the spring 40 includes a tang 54 which is engageable by a projection 56 on an actuating member 58. The other end of spring 40 includes the tang 60 which is confined in a slot 62 in output member 22.

The actuating members 48 and 58 include gear teeth 64 and 66 respectively. Such gear teeth 64 and 66 are engaged by gears 68 and 70 respectively which are fixedly mounted upon a rotatable shaft 72 extending through supporting structures 74 and 76. The shaft 72 is connected for rotation to a motor such as servo motor 78, the motor 78 having an output speed depending upon the input signal to it. Rotation of the motor 78 imparts rotation to the actuating members 48 and 58 causing one of the springs 38 or 40 to be expanded depending upon the direction of rotation of the motor. The springs 38 and 40 are so wound that the rotation of the actuating member in the direction shown in Fig. 2, will cause the projection 46 upon the actuating member 48 to engage the tang 42 of spring 38 and unwind this spring, whereas rotation of the actuating member 58 in the other direction will cause projection 56 on actuating member 58 to engage the tank 54 on the spring 40 causing the latter spring to be expanded. During the expansion of spring 38 or of spring 40 the ends fixed in the output member remain stationary, the inertia of the output member and integral output shaft, even in the absence of a load on the output shaft, acting to hold the tangs stationary.

Expansion of the spring 38 causes the outer surface of the spring to engage the surfaces 14 and 34 of the input member 10 and output member 22 respectively, whereas expansion of the spring 40 causes the outer surface of this spring to engage surface 18 of input member 12 and the surface 36 of output member 22 respectively. The engagement of the spring 38 with the input member 10 and surface 34 of output member 22 provides for rotation of output shaft 24 in one direction, and the engagement of the spring 40 with input member 12 and surface 36 of output member 22 provides for rotation of shaft 24 in the other direction. The input members 10 and 12 are rotated continuously at constant speed by a main source of input power. As shown, the members 10 and 12 include the gears 80 and 82 respectively which mesh with a gear 84 connected by shaft 86 to an input power source. In this way input members 10 and 12 are caused to rotate in opposite directions, and when the spring 38 is expanded input member 10 drives the output member 22 in one direction through this spring, whereas when spring 40 is expanded input member 12 drives output member 22 in the other direction through the latter spring.

Continuous rotation of the output member 22 at maximum speed occurs if actuating member 48 or 58 is rotated at a speed as great as the speed of the input member. A step output is, however, obtained by driving the actuating members at speeds slower than the input members 10 and 12 and an average output speed which is dependent upon the speed of the actuating members results. Assuming that the output shaft is stationary and the motor 78 is energized to rotate the actuating member 48 in the direction shown (Fig. 2) at a speed less than the speed of input members 10 and 12, projection 46 is caused to engage the tang 42 of spring 38 to expand the spring into contact with surfaces 14 and 34 whereupon a driving connection is established between input member 10 and output member 22 such that the shaft 24 is caused to rotate. Rotation of output member 22, however, moves the spring 38 and therefore tang 42 ahead of the projection 46 on actuating member 48 permitting the spring to contract to the surfaces 16 and 30. When the spring assumes a contracted position, movement of the output member is halted. When the projection 46 on the actuating member 48 catches up to the tang 42 on spring 38, spring 38 is expanded once again to the surfaces 14 and 34 causing motion of the output shaft once again. Movement of the output member 22 again permits the spring to contract. Obviously the output member 22 and the shaft 24 will be moved in a series of steps in the direction indicated in Fig. 2. Rotation of the motor 78 in the direction opposite to that shown will in a similar manner produce a motion of output member 22 and shaft 24 in a series of steps in a direction opposite to that indicated in Fig. 2. With the speed of the motor 78 proportional to the input current thereto, the average speed of the output shaft is directly proportional to such input current.

When input member 10 drives output member 22 through the spring 38, output member 22 acts on the tang 60 of spring 40 in a direction to release the coils of spring 40 from tight engagement with surfaces 20 and 32 such that the spring 40 may rotate freely. Similarly when input member 12 drives output member 22 through spring 40, output member 22 acts on tang 52 of spring 38 to release the coils of spring 38 from tight engagement with surfaces 16 and 30 such that the spring 38 may freely rotate. Therefore, no interference results from the operation of the respective springs. A negative torque on the output shaft tends to wind one or the other of the springs according to the direction of the torque such that movement of the output shaft is prevented. Movement of the output shaft acting to move output member 22, for example in the direction indicated in Fig. 2 tends to wind the spring 38, whereas movement of the output shaft acting to move member 22 in the other direction tends to wind the spring 40.

While only one form of the device incorporating the features of the invention has been shown, it will be apparent that various changes and modifications may be made therein by those skilled in the art without departing from the spirit and scope of the invention as set forth in the appended claims.

I claim:

1. A power transmitting device comprising, a fixed member, a rotatable output member, a spring normally wrapped on said fixed and output members for holding the output member, a rotatable input member, means for driving the input member, motor means, spring actuating means rotatable by the motor means for expanding the spring into contact with the input member and a surface of the output member whereby the output member is driven by the input member through said spring for as long as the spring actuating means is maintained at the speed of the input member.

2. A power transmitting device comprising; a fixed member; a rotatable output member; a spring normally wrapped on said fixed and output members for holding the output member; a rotatable input member; means for driving the input member; rotatably mounted spring actuating means; control means for driving the actuating means at a speed less than the speed of the input member whereby the spring is periodically expanded into contact with the input member and a surface of the output member to drivably connect input and output members, and periodically contracts resulting in intermittent rotation of the output member at an average speed depending upon the speed of the actuating means.

3. A power transmitting device comprising a rotatably mounted input member; means for driving the input member; a rotatably mounted output member; fixed structure; a spring biased to engage surfaces of the output member and fixed structure to thereby hold the output member, one end of the spring being engageable with one of said members; a rotatably mounted actuating member to engage the other end of the spring; control means for driving the actuating member at a speed less than the speed of the input member whereby the spring is periodically caused to contact the input member and a surface of the output member thereby drivably connecting input and output members, and periodically contracts resulting in intermittent rotation of the output member at an average speed depending upon the speed of the actuating means.

4. A power transmitting device comprising fixed structure, a rotatable output member; a pair of springs normally wrapped on the fixed structure and said output member for holding the output member stationary; a pair of rotatable input members; means for driving the respective input members in opposite directions; reversible motor means; spring actuating means rotatable by the motor means in one direction at a speed less than the speed of one input member for periodically expanding one of said springs into contact with said one input member and a surface of the output member whereby the output member is driven intermittently by the one input member in the said one direction at an average speed depending upon the speed of the actuating means in the one direction, and rotatable by the motor means in another direction at a speed less than the speed of the other input member for periodically expanding the other spring into contact with the said other input member and another surface of the output member whereby the output member is driven intermittently by the other input member in the said other direction at an average speed depending upon the speed of the actuating means in the other direction.

5. A power transmitting device comprising fixed structure, a rotatable output member, a pair of springs normally wrapped on the fixed structure and said output member for holding the output member stationary, a pair of rotatable input members, means for driving the respective input members in opposite directions, reversible motor means, a shaft rotatable by the motor means, a first driving member on the shaft, a first actuator rotatable thereby in one direction at a speed less than the speed of one input member for periodically expanding one of said springs into contact with one input member and a surface of the output member whereby the output member is driven intermittently by the one input member in the said one direction at an average speed depending upon the speed of the first actuator in the one direction, a second driving member on the shaft, and a second actuator rotatable thereby in another direction at a speed less than the speed of the other input member for periodically expanding the other spring into contact with the said other input member and another surface of the output member whereby the output member is driven intermittently by the other input member in the said other direction at an average speed depending upon the speed of the second actuator in the other direction.

6. A power transmitting device comprising; a pair of rotatable input members; means for driving the respective input members in opposite directions; an output member disposed between the input members; a pair of fixed members, one fixed member being disposed in concentric relation to one input member and the other fixed member being disposed in concentric relation to the other input member; a pair of springs, one spring being normally wrapped on one fixed member and the output member, and the other spring being normally wrapped on the other fixed member and said output member; reversible motor means; spring actuating means rotatable by the motor means in one direction at a speed less than the speed of one input member for periodically expanding one of said springs into contact with said one input member and a surface of the output member whereby the output member is driven intermittently by the one input member in the said one direction at an average speed depending upon the speed of the actuating means in the one direction, and rotatable by the motor means in another direction at a speed less than the speed of the other input member for periodically expanding the other spring into contact with the said other input member and another surface of the output member whereby the output member is driven intermittently by the other input member in the said other direction at an average speed depending upon the speed of the actuating means in the other direction.

7. A power transmitting device comprising; a pair of rotatable input members; means for driving the respective input members in opposite directions; an output member disposed between the input members; a pair of fixed members, one fixed member being disposed in concentric relation to one input member and the other fixed member being disposed in concentric relation to the other fixed member; a pair of springs, one spring being normally wrapped on one fixed member and the output member, and the other spring being normally wrapped on the other fixed member and said output member; reversible motor means; a shaft rotatable by the motor means; a first driving member on the shaft; a first actuator rotatable thereby in one direction at a speed less than the speed of one input member for periodically expanding the other spring into contact with the said other input member and another surface of the output member whereby the output member is driven intermittently by the other input member in the said other direction at an average speed depending upon the speed of the second actuator in the other direction.

8. A power transmitting device comprising a rotatable input member, means for driving the input member, a rotatable output member, a spring connected to the output member, motor means operable independently of said driving means, spring actuating means rotatable by the motor means to radially expand the spring into contact with the input member whereby the output member is driven by the input member through said spring only for as long as the spring actuating means is maintained at the speed of the input member.

9. The combination as defined in claim 8 including braking means for stopping the rotation of the output member whenever the speed of the spring exceeds the speed of said spring actuating means.

References Cited in the file of this patent

UNITED STATES PATENTS

| Re. 22,779 | Swift | Aug. 13, 1946 |
| 2,569,586 | Small | Oct. 2, 1951 |

FOREIGN PATENTS

| 526,314 | Great Britain | Sept. 16, 1940 |